(No Model.)
C. E. BLAKE, Sr.
DENTAL FORCEPS.
No. 491,518. Patented Feb. 14, 1893.
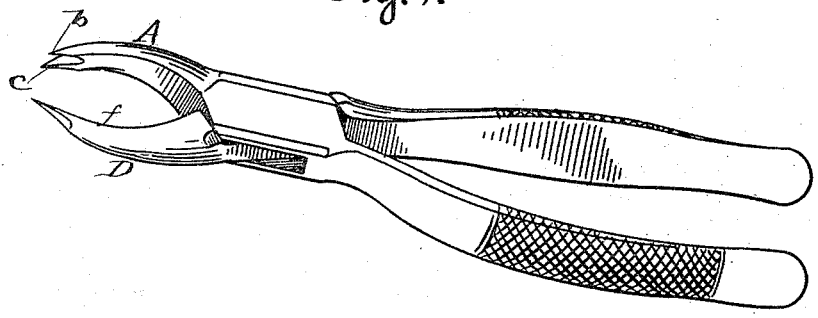
Fig. 1.
Fig. 3.
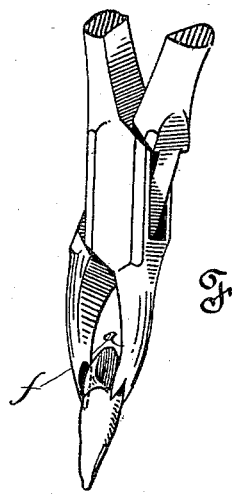
Fig. 2.
Fig. 4.
Witnesses.
H. Monteverde.
Iva V. Hitchcock.
Inventor.
Chas. E. Blake Sr.

UNITED STATES PATENT OFFICE.

CHARLES E. BLAKE, SR., OF SAN FRANCISCO, CALIFORNIA.

DENTAL FORCEPS.

SPECIFICATION forming part of Letters Patent No. 491,518, dated February 14, 1893.

Application filed June 30, 1892. Serial No. 438,517. (No model.)

*To all whom it may concern:*

Be it known that I, CHARLES E. BLAKE, Sr., a citizen of the United States, residing at San Francisco, in the county of San Francisco and State of California, have invented certain new and useful Improvements in Dental Forceps; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.
My invention relates to an improved dental forceps designed more especially for front teeth and roots, and it has for its object to preliminarily cut around and dissect the gum and process from the tooth, and to subsequently enable the jaws of the same forceps to secure a firm grip upon the roots, to provide for the extraction of the tooth at a continuous operation, and to these ends the invention consists in providing one jaw or beak of the forceps with a bifurcated or two pronged point and the other jaw with a single sharp point, triangular in cross section, and standing intermediately of the prongs or points of the aforesaid jaw or beak, substantially as hereinafter more fully disclosed and pointed out in the claim.

In the accompanying drawings: Figure 1 is a perspective view of my improved forceps, the jaws or beaks being open, and Fig. 2 is a broken perspective view of the same, showing it as applied for practical use in extracting a tooth. Fig. 4 is cross section of single pronged beak. Fig. 3 is cross section of one of the prongs on the two pronged beak.
In carrying out my invention, I curve the beak or jaw, A, of the forceps from base to point, and provide it with two claw-shaped prongs or points, $b$ $c$, at its extremity, preferably concaving or hollowing out its inner surface or face. The opposite jaw or beak, D, is curved and tapering from base to point, and has its point made triangular in cross section, and having its inner side or face just slightly concaved, thus furnishing it with sharp cutting edges at its inner side angles, as at $f$ $g$. It is thus caused to serve as a dissecting instrument for separating the gum and process from the wall of the tooth.

The jaw or beak, D, is longer than the beak or jaw, A, so that its point extends farther up the root along the medial line of the tooth.

The points of the beaks or jaws are sharp and tapering, to enable them to be readily inserted between the gum and the tooth, so that, while the two-prong pointed jaw, A, clasps or embraces the tooth on one side, the single pointed jaw or beak is used as a dissecting instrument for cutting and separating the gum and process on the opposite side of the tooth, which is done by turning the forceps so as to cause the single pointed jaw to cut around and dissect the gum and process from the tooth. After the dissection operation has been completed, the forceps is then used for extracting the tooth at one or a continuous operation, as it provides a firm grip that will permit of the application of the necessary force to draw or extract the tooth or roots without resorting to the use of another instrument.

Having thus described my invention, what I claim and desire to secure by Letters Patent is:

The dental forceps having one jaw provided with a single, sharp, dissecting point, triangular in cross section, and its other jaw or beak bifurcated or provided with two claw-shaped prongs or points, substantially as set forth.

In testimony whereof I affix my signature in presence of two witnesses.

CHAS. E. BLAKE, SR.

Witnesses:
THOS. J. STALEY,
J. WM. MISTER.